United States Patent
Park

(10) Patent No.: US 7,545,457 B2
(45) Date of Patent: Jun. 9, 2009

(54) INSULATING SHIELD COVER FOR PROTECTING INVERTER CIRCUIT BOARD WITH TRANSFORMER AND LCD DEVICE USING DOUBLE-SIDED TAPE FOR ATTACHING BOTH UPPER AND LOWER PORTIONS OF THE CIRCUIT BOARD WITH TRANSFORMER TO THE SHIELD COVER

(75) Inventor: Jae Hyung Park, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 194 days.

(21) Appl. No.: 11/139,678

(22) Filed: May 31, 2005

(65) Prior Publication Data

US 2005/0264980 A1 Dec. 1, 2005

(30) Foreign Application Priority Data

May 31, 2004 (KR) ...................... 10-2004-0039357

(51) Int. Cl.
*G02F 1/1333* (2006.01)
(52) U.S. Cl. ............................ 349/58; 349/59; 349/60; 349/138
(58) Field of Classification Search ............. 349/58–60, 349/138
See application file for complete search history.

(56) References Cited

U.S. PATENT DOCUMENTS

| 4,838,653 | A | * | 6/1989 | Mohebban | 349/199 |
|---|---|---|---|---|---|
| 6,332,783 | B1 | * | 12/2001 | Ukiya et al. | 439/76.1 |
| 6,549,263 | B1 | * | 4/2003 | Kim | 349/58 |
| 6,636,281 | B1 | * | 10/2003 | Kanatsu | 349/58 |
| 2001/0050735 | A1 | * | 12/2001 | Yajima et al. | 349/65 |
| 2002/0126461 | A1 | * | 9/2002 | Yazaki | 361/752 |
| 2002/0191126 | A1 | * | 12/2002 | Sasuga et al. | 349/58 |
| 2004/0066473 | A1 | | 4/2004 | Fukuwaki | |

* cited by examiner

*Primary Examiner*—David Nelms
*Assistant Examiner*—John Heyman
(74) *Attorney, Agent, or Firm*—McKenna Long & Aldridge LLP

(57) ABSTRACT

A shield cover for a liquid crystal device is made of an insulating film for protecting and insulating an inverter, including a printed circuit board at a lower surface of the inverter and a transformer at an upper surface of the inverter. The shield cover extends from a portion of the lower surface of the inverter to the entire upper surface of the inverter, the shield cover attached to the liquid crystal device to cover the printed circuit board at the lower surface of the inverter and the entire upper surface of the inverter including the transformer.

15 Claims, 3 Drawing Sheets

INSULATING SHIELD COVER FOR PROTECTING INVERTER CIRCUIT BOARD WITH TRANSFORMER AND LCD DEVICE USING DOUBLE-SIDED TAPE FOR ATTACHING BOTH UPPER AND LOWER PORTIONS OF THE CIRCUIT BOARD WITH TRANSFORMER TO THE SHIELD COVER

This application claims the benefit of Korean Application No. P2004-39357 filed on May 31, 2004, which is hereby incorporated by reference.

BACKGROUND OF THE INVENTION

1. Field of the Invention

The present invention relates to liquid crystal display device, and more particularly, to a shield cover for insulating a transformer and protecting an inverter and a liquid crystal display device using the same.

2. Description of the Related Art

Much effort has been devoted to research and develop various display devices to address the demand of information-driven society. These display devices are divided into luminescent display devices, which emits light spontaneously, and non-luminescent display devices, which do not emit light spontaneously. Examples of luminescent display devices are cathode ray tube (CRT), electro-luminescent display (ELD), light-emitting diode (LED), vacuum fluorescent display (VFD), field emission display (FED), and plasma display panel (PDP).

A liquid crystal device (LCD) is an example of a non-luminescent display device. The LCD device has been most widely used because it is compact, thin, and consumes low power. The LCD device is increasingly being used as a substitute for Cathode Ray Tube (CRT). In addition to being used on mobile devices such as notebook computers, LCD devices have been developed as computer monitors and television displays. The LCD device is being viewed as a next generation display device along with plasma display panel and electro-luminescence display.

Generally, a desired image is displayed on an LCD device by controlling the optical transmittance of a liquid crystal material with data signals that depend on image information. However, the LCD device, which is a non-luminescent display device, does not spontaneously emit light. Each of these data signals corresponds to individual picture elements or pixels arranged in a matrix.

FIG. 1 is an exploded perspective view of an LCD device in accordance with a related art. Referring to FIG. 1, the LCD device includes a liquid crystal display panel 10. A plurality of pixels (not shown) are arranged in the LCD device to form a matrix. Driving circuit units 20 and 30 are provided for driving the pixels. A backlight unit 40 is required for irradiating light on the liquid crystal display panel 10 because the LCD device does not spontaneously emit light. In addition, the LCD device includes various other components for supporting and coupling the liquid crystal display panel 10, the driving circuit units 20 and 30, and the backlight unit 40.

Although not shown, the liquid crystal display panel 10 includes an array substrate and a color filter substrate facing each other. The array substrate and the color filter substrate are attached to each other in such a manner as to maintain a uniform cell gap therebetween. A liquid crystal layer is formed between the array substrate and the color filter substrate.

The driving circuit units 20 and 30 include various devices (not all shown). For example, a timing controller (not shown) is provided for driving the liquid crystal display panel 10. Printed circuit boards (PCB) 21 and 31 are provided, to which tape carrier packages (TCP) 22 and 32 are attached.

A common electrode and a pixel electrode (not shown) are formed within the liquid crystal display panel 10. The common electrode and the pixel electrode generates an electric field through the liquid crystal layer. When a voltage data signal is applied between the pixel electrode and the common electrode, the liquid crystal in the liquid crystal layer is rotated due to the dielectric anisotropy of the liquid crystal in accordance with the electric field generated between the common electrode and the pixel electrode. Accordingly, light is transmitted or blocked at each pixel, thereby displaying a text or an image.

The backlight unit 40 includes a lamp assembly (not shown), a reflection sheet 41, a light guide plate 42, and a plurality of optical sheets 43. The lamp assembly includes a fluorescent lamp (not shown) for emitting light. The reflection sheet 41 reflects light emitted by the fluorescent lamp. The light guide plate 42 guides the emitted light. The optical sheets 43 diffuse and collect light transmitted from the light guide plate 42.

The liquid crystal display panel 10 and the backlight unit 40 are stacked on a mold frame 44. The mold frame 44 supports lateral surfaces of the stacked liquid crystal display panel 10 and the backlight unit 40. An edge of an upper surface of the liquid crystal display panel 10 is pressed against an upper case 51 when the upper case 51 and the mold frame 44 are attached to each other by a screw (not shown).

The liquid crystal display panel 10 and the backlight unit 40 are also supported by a lower case 52. The lower case is arranged at a rear surface of the backlight unit 40. The lower case 52 and the upper case 51 are attached to each other by a screw (not shown).

The LCD device is provided with an inverter for driving a fluorescent lamp. The inverter (not shown) is provided with a plurality of electric components, such as a transformer, an insulating film (not shown), and a shield cover 53. The transformer drives the fluorescent lamp with an alternating current by applying a high voltage to the fluorescent lamp. The insulating film protects the transformer and insulates the transformer from other components by shielding a parasitic magnetic component generated by the transformer. The shield cover 53 protects the inverter from external impact. The shield cover 53 is mounted on the inverter and is attached by a screw (not shown) through the lower case 52 and a screw groove 54, which will be described below.

FIG. 2A is a schematic view of an insulating film attached to an inverter in the LCD device of FIG. 1 in accordance with the related art. Referring to FIG. 2A, the related art LCD device is driven by a direct type backlight. An insulating film 64 made of polyethylene terephthalate (PET) extends from an upper end of a transformer 62 to a lower end of a printed circuit board of an inverter 61. The insulating film 64 protects the transformer 62 within the inverter 61, and insulates the transformer 62 and other components (not shown) by shielding a parasitic magnetic component generated by the transformer 62.

The insulating film 64 is thin, having a thickness of less than 0.1 mm. The insulating film 64 is designed specifically to insulate the inverter 61 and protect the transformer 62. However, the insulating film 64 does not provide protection for the inverter. When the inverter 61 is attached to the LCD device, a shield cover needs be attached to the LCD device, in addition to the insulating film 64, to protect the inverter 61.

FIG. 2B is a schematic view of a shield cover attached to an inverter in the LCD device of FIG. 1 in accordance with the related art. Referring to FIG. 2B, the related art LCD device includes a shield cover 53 made of metal. The shield cover 53 is attached to the lower case 52 to protect the inverter 61, which is mounted at a rear surface of the lower case 52, from external impact. The shield cover 53 is attached to the lower case 52 by a screw through a plurality of coupling grooves 54. A radiating unit 56 is also provided for radiating heat.

In the related art LCD device, the shield cover can electrically interfere with the inverter. Accordingly, a gap is maintained between the shield cover and the inverter. The required height of the gap increases the overall thickness of the LCD device. This increase in overall thickness of the LCD device caused by the shield cover prevents the construction of a slim LCD device according to the related art. Moreover, the shield cover increases a parasitic capacitance between the transformer and a high voltage terminal. Thus, the shield cover degrades the efficiency of the inverter. Accordingly, power consumption of the LCD device is increased, and the uniformity of a displayed white image is degraded.

SUMMARY OF THE INVENTION

Accordingly, the present invention is directed to a shield cover for protecting an inverter, and a liquid crystal display device using the same, that substantially obviates one or more of the problems due to limitations and disadvantages of the related art.

An object of the present invention is to provide a shield cover capable of performing an insulating function and a covering function for an inverter in a liquid crystal display device.

Another object of the present invention is to provide a shield cover for an inverter without increasing a parasitic capacitance in a liquid crystal display device.

Another object of the present invention is to provide a shield cover while reducing the thickness of a liquid crystal display device.

Another object of the present invention is to provide a shield cover capable of increasing the efficiency of an inverter in a liquid crystal device.

Another object of the present invention is to provide a shield cover capable of reducing the power consumption of an inverter in a liquid crystal device.

To achieve these and other advantages and in accordance with the purpose of the present invention, as embodied and broadly described herein, a shield cover for a liquid crystal device includes an insulating film for protecting and insulating an inverter, including a printed circuit board at a lower surface of the inverter and a transformer at an upper surface of the inverter, the shield cover extending from a portion of the lower surface of the inverter to the entire upper surface of the inverter, the shield cover attached to the liquid crystal device to cover the printed circuit board at the lower surface of the inverter and the entire upper surface of the inverter including the transformer.

In another aspect, a liquid crystal display device includes a mold frame; a liquid crystal display panel attached to the mold frame; a backlight unit including a lamp for irradiating light on the liquid crystal display panel; an inverter that applies a driving voltage to the fluorescent lamp, the inverter being positioned at a lower portion of the liquid crystal display panel; and a shield cover made of an insulating film for protecting and insulating the inverter, including a printed circuit board at a lower surface of the inverter, the shield cover being attached to the inverter to cover a portion of the lower surface of the inverter and the entire upper surface of the inverter.

In another aspect, a shield cover for a liquid crystal device includes an upper portion and a lower portion integrally forming an insulating film for protecting and insulating an inverter, including a printed circuit board at a lower surface of the inverter, the lower portion of the shield cover covering the printed circuit board, and the upper portion of the shield cover being bent near a protruding transformer at an upper surface of the inverter to cover the entire upper surface of the inverter including the transformer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
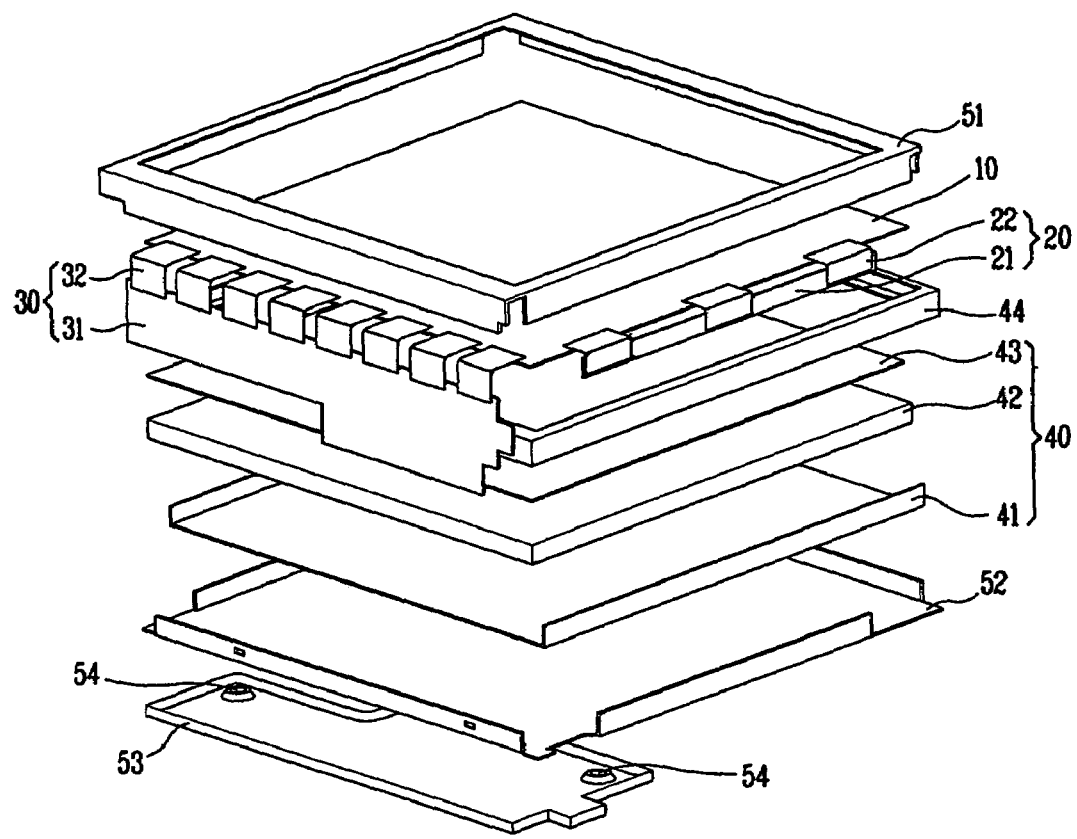
FIG. 1 is an exploded perspective view of an LCD device in accordance with the related art.
Figure 2A:
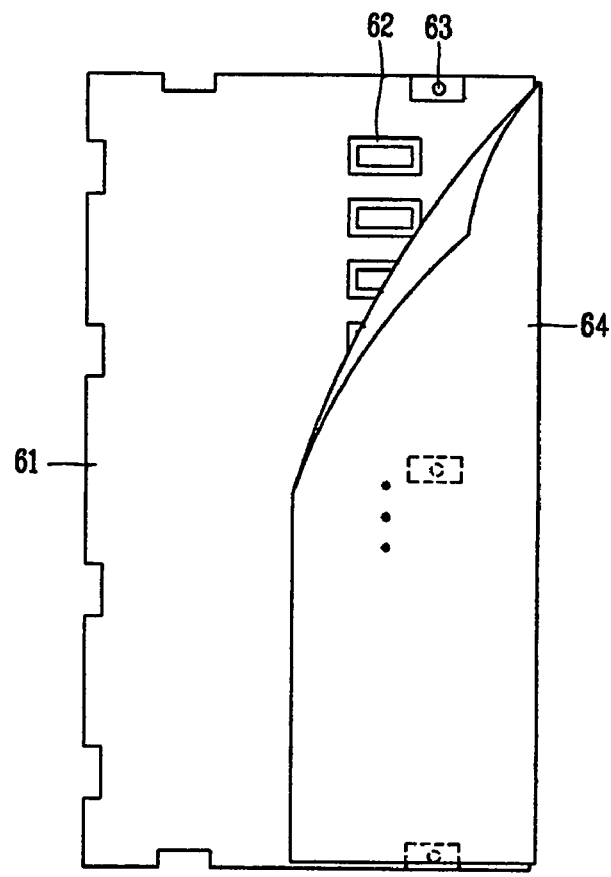
FIG. 2A is a schematic view of an insulating film attached to an inverter in the LCD device of FIG. 1 in accordance with the related art.
Figure 2B:
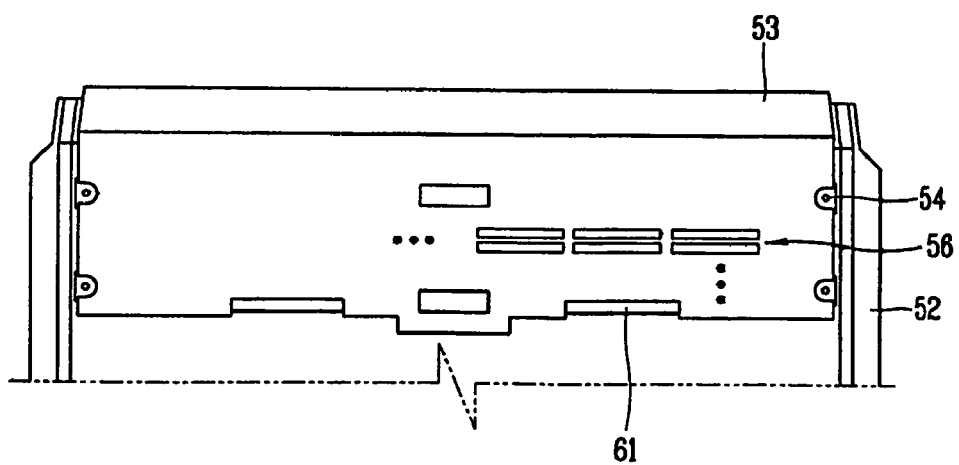
FIG. 2B is a schematic view of a shield cover attached to an inverter in the LCD device of FIG. 1 in accordance with the related art.
Figure 3:
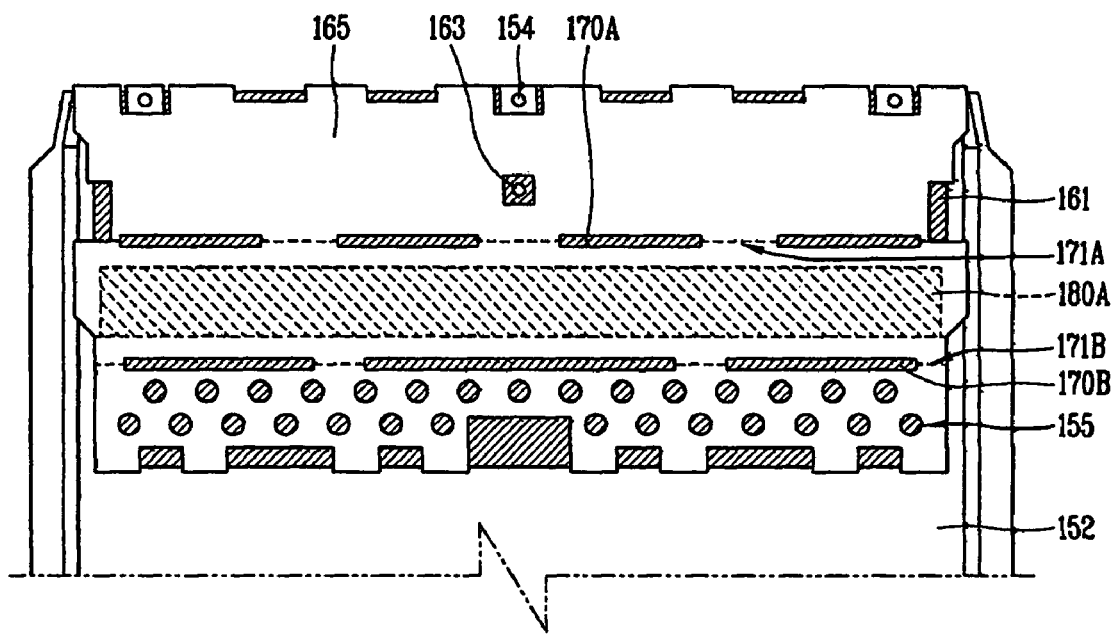
FIG. 3 shows an exemplary partial view of a rear surface of an LCD device to which a shield cover is attached according to an embodiment of the present invention.

FIG. 3 shows an exemplary partial view of a rear surface of an LCD device to which a shield cover is attached according to an embodiment of the present invention. Referring to FIG. 3, a shield cover 165 is attached to the inverter 161. The shield cover 165 performs an insulating function, which is to insulate a transformer part (not shown) of the inverter 161. The shield cover 165 also performs the additional function of covering the inverter 161 to protect the inverter 161. Thus, no additional separate cover is required for protecting the inverter 161, thereby reducing the thickness and material cost of the LCD device.

The shield cover 165 includes an insulating film of a polyethylene terephthalate (PET) material. The insulating film of PET in the shield cover provides the insulation and protection function of the shield cover 165. The PET insulating material protects and insulates a transformer part of the inverter 161. In particular, a metal material of the shield cover is replaced with a PET material. The PET insulating material prevents an increase in the parasitic capacitance of the transformer or other components and a high wire voltage. The shield cover 165 is formed with a thickness of about 0.2 mm-1 mm. Thus, the shield cover 165 is hard but flexible. Accordingly, the shield cover 165 performs the function of protecting the inverter 161.

Although not shown, the LCD device includes a liquid crystal display panel. A plurality of pixels (not shown) are arranged in the LCD device to form a matrix. Driving circuit units are provided for driving the pixels. A backlight unit is required for irradiating light on the liquid crystal display panel because the LCD device does not spontaneously emit light. In addition, the LCD device includes various other components for supporting and attaching the liquid crystal display panel, the driving circuit units, and the backlight unit. The liquid crystal display panel and the backlight unit are stacked on a mold frame. The mold frame supports lateral surfaces of the stacked liquid crystal display panel and the backlight unit.

As shown in FIG. 3, the shield cover 165 may be provided with a plurality of heat radiating units 155. The heat radiating unit 155 radiates heat generated by the inverter 161. In an embodiment of the present invention, as shown in FIG. 3, the heat radiating units 155 are circular. In another embodiment of the present invention, the heat radiating units may have other shapes as long as heat can be effectively transmitted outward. In an embodiment of the present invention, as shown in FIG. 3, the heat radiating units 155 are formed at a lower portion of the shield cover 165. In another embodiment of the present invention, the heat radiating units 155 may be formed at an upper portion of the shield cover 165.

Still referring to FIG. 3, a plurality of coupling grooves 154 and 163 are formed on the shield cover 165. The coupling grooves 154 and 163 simultaneously attach the inverter 161 and the shield cover 165 to the LCD device. In particular, since the shield cover 165 is integrally attached to the inverter 161, and the inverter 165 is attached to the LCD device, the shield cover 165 is also attached to the LCD device.

Bending slits 170A and 170B and bending lines 171A and 171B may be provided on the shield cover. The bending slits 170A and 170B and the bending lines 171A and 171B protect protruding components, such as a transformer mounted on the inverter 161.

Figure 4:
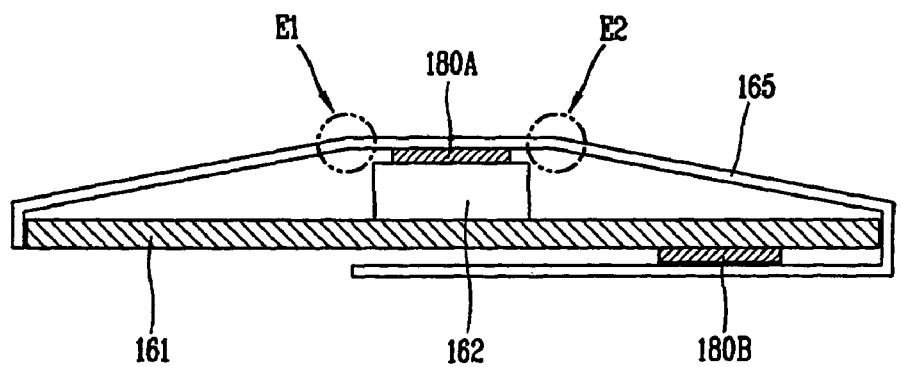
FIG. 4 is a cross-sectional view depicting an exemplary method of attaching of a shield cover to an inverter of the LCD device in accordance with an embodiment of the present invention.

FIG. 4 is a cross-sectional view depicting an exemplary method of attaching of a shield cover to an inverter of the LCD device in accordance with an embodiment of the present invention. Referring to FIG. 4, the shield cover 165 extends from a portion of a lower surface of the inverter 161 to an entire upper surface of the inverter 161 to cover a printed circuit board at the lower surface of the inverter 161 and the entire upper surface of the inverter 161 including the transformer 162. The shield cover 165 is attached to the inverter 161 by using, for example, double sided tapes 180A and 180B.

The double sided tapes 180A are attached to surfaces of the shield cover 165 facing an upper surface of the transformer 162 mounted on an upper side of the inverter 161. The double sided tapes 180B are also attached at a portion of the printed circuit board on the lower side of the inverter 161. Thus, the shied cover 165 is attached to the inverter 161 by the double sided tapes 180A and 180B on the upper side or the lower side of the inverter 161.

A protruding component, such as the transformer 162, may be mounted on the printed circuit board of the inverter 161. The shield cover 165 has a thickness appropriate for protecting the inverter 161. In an embodiment of the present invention, as shown in FIG. 3 and FIG. 4, the first and second bending lines 171A and 171B are formed at a surface of the shield cover 165. The plural bending slits 170A and 170B are formed along the bending lines 171A and 171B. Accordingly, the shield cover 165 is bent at bending portions E1 and E2, thereby effectively protecting and insulating components, for example the thick transformer 162 and the inverter 161, in spite of the protruding transformer.

In accordance with an embodiment of the present invention, the shield cover being formed of a PET insulating material with an appropriate thickness performs not only an insulating function but also a covering function for the inverter. Accordingly, an increase in parasitic capacitance is prevented, and the thickness of an LCD device is reduced. Thus, the efficiency of the inverter is maximized, thereby decreasing the power consumption of the LCD device.

Moreover, in accordance with an embodiment of the present invention, the inverter can be protected without the need of an additional separate cover. Thus, the thickness of the LCD device is decreased by an amount corresponding to the thickness of the shield cover. Also, the cover is formed of PET rather than expensive steel stainless material. Accordingly, the total cost of the LCD device is reduced.

It will be apparent to those skilled in the art that various modifications and variations can be made in the shield cover for protecting an inverter of the invention, and the liquid crystal display device using the same, without departing from the spirit or scope of the invention. Thus, it is intended that the present invention cover the modifications and variations of this invention provided they come within the scope of the appended claims and their equivalents.

What is claimed is:

1. A shield cover for a liquid crystal device, comprising:
an inverter printed circuit board;
a transformer mounted at an upper surface of the inverter printed circuit board; and
an insulating film having a lower portion extending from and covering a portion of a lower surface of the inverter printed circuit board to an edge of the inverter printed circuit board, the insulating film having an upper portion extending from the insulating film lower portion to cover the entire upper surface of the inverter printed circuit board including the transformer for protecting the inverter printed circuit board and insulating the transformer, wherein the upper portion of the insulating film is attached to the upper surface of the inverter printed circuit board with a double sided tape and the lower portion of the insulating film is attached to the lower surface of the inverter printed circuit board with another double sided tape.

2. The shield cover of claim 1, wherein the insulating film includes a polyethylene terephthalate (PET) material.

3. The shield cover of claim 1, wherein the insulating film has a thickness of about 0.2mm-1mm.

4. The shield cover of claim 1, wherein the insulating film includes a plurality of heat radiating units for radiating heat generated by the inverter printed circuit board.

5. The shield cover of claim 1, wherein the insulating film is attached to a liquid crystal display device through at least one first coupling groove formed on the insulating film and at least one second coupling groove formed on the inverter printed circuit board.

6. The shield cover of claim 1, wherein the insulating film includes bending slits and bending lines for protecting a protruding component on the inverter printed circuit board.

7. The shield cover of claim 6, wherein the bending lines are formed at lateral surfaces of a protruding component, and the bending slits are formed along the bending lines to bend the insulating film.

8. A liquid crystal display device comprising:
a mold frame;
a liquid crystal display panel attached to the mold frame;

a backlight unit including a lamp for irradiating light on the liquid crystal display panel;

an inverter printed circuit board that applies a driving voltage to the lamp, the inverter printed circuit board being positioned at a lower portion of the liquid crystal display panel;

a transformer mounted at an upper surface of the inverter printed circuit board; and an insulating film having a lower portion extending from and covering a portion of a lower surface of the inverter printed circuit board to an edge portion of the inverter printed circuit board, the insulating film having an upper portion extending from the insulating film lower portion to cover the entire upper surface of the inverter printed circuit board including the transformer for protecting the inverter printed circuit board and insulating the transformer, wherein the upper portion of the insulating film is attached to the upper surface of the inverter printed circuit board with a double sided tape and the lower portion of the insulating film is attached to the lower surface of the inverter printed circuit board with another double sided tape.

9. The liquid crystal display device of claim 8, wherein the insulating film includes a polyethylene terephthalate material.

10. The liquid crystal display device of claim 8, wherein the insulating film has a thickness of about 0.2mm-1mm.

11. The liquid crystal display device of claim 8, including a lower cover for supporting the liquid crystal display panel, the mold frame, and the backlight unit by attaching one to the other.

12. The liquid crystal display device of claim 11, wherein the insulating film and the inverter printed circuit board are attached to the lower cover through at least one first coupling groove formed on the insulating film and at least one second coupling groove formed on the inverter printed circuit board.

13. The liquid crystal display device of claim 8, wherein the insulating film includes bending slits and bending lines for protecting a protruding component on the inverter printed circuit board.

14. The liquid crystal display device of claim 13, wherein the bending lines are formed at lateral surfaces of the protruding component, and the bending slits are formed along the bending lines to bend the insulating film.

15. A shield cover for a liquid crystal device, comprising:

an inverter printed circuit board;

a transformer mounted at an upper surface of the inverter printed circuit board; and an insulating film having a lower portion extending from and covering a portion of a lower surface of the inverter printed circuit board to an edge portion of the inverter printed circuit board, the insulating film having an upper portion extending from the insulating film lower portion to cover the entire upper surface of the inverter printed circuit board including the transformer for protecting the inverter printed circuit board and insulating the transformer to prevent an increase in a parasitic capacitance of the transformer, wherein the upper portion of the insulating film is attached to the upper and surface of the inverter printed circuit board with a double sided tape and the lower portion of the insulating film is attached to the lower surface of the inverter printed circuit board with another double sided tape.

* * * * *